US010026065B2

(12) United States Patent
Capel et al.

(10) Patent No.: US 10,026,065 B2
(45) Date of Patent: *Jul. 17, 2018

(54) SYSTEM AND METHOD FOR COLLECTING AND DISTRIBUTING DIGITAL RECEIPTS

(71) Applicant: Integrated Bank Technology, Inc., Cedar Park, TX (US)

(72) Inventors: Charles W. Capel, Cedar Park, TX (US); Joel Kunze, Cedar Park, TX (US)

(73) Assignee: INTEGRATED BANK TECHNOLOGY, INC., Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,981

(22) Filed: Apr. 17, 2017

(65) Prior Publication Data
US 2017/0221020 A1    Aug. 3, 2017

Related U.S. Application Data

(63) Continuation of application No. 13/011,132, filed on Jan. 21, 2011, now Pat. No. 9,626,663.

(51) Int. Cl.
*G06Q 20/00* (2012.01)
*G06Q 20/38* (2012.01)
(Continued)

(52) U.S. Cl.
CPC ......... *G06Q 20/0453* (2013.01); *G06F 15/16* (2013.01); *G06Q 20/10* (2013.01);
(Continued)

(58) Field of Classification Search
None
See application file for complete search history.

(56) References Cited

U.S. PATENT DOCUMENTS 5,739,512 A    4/1998 Tognazzini
6,341,353 B1 *  1/2002 Herman .................. A63F 13/12
                                                    705/39

(Continued)

OTHER PUBLICATIONS

Digital Receipts Network—Company, Digital Receipts Network, Aug. 26, 2010 (pp. 1-2).

(Continued)

*Primary Examiner* — Robert R Niquette
*Assistant Examiner* — Joseph W King
(74) *Attorney, Agent, or Firm* — McAndrews, Held & Malloy, Ltd.

(57) ABSTRACT

According to certain embodiments of the present invention, a method for coordinating the provision of a digital receipt associated with a financial transaction is provided. According to the method, a digital receipt and an identifier corresponding to the digital receipt are communicated from an acquirer and received at a digital receipt server. The digital receipt and the corresponding identifier may be communicated through a second network, such as the Internet. The digital receipt and the identifier corresponding to the digital receipt are then stored in the digital receipt server. The digital receipt server also receives an inquiry and an identifier corresponding to the inquiry, which are communicated from an issuer. The inquiry and the corresponding identifier may be communicated through the second network. Prior to this, the identifier is transmitted from the acquirer to the issuer, for example, through a first network such as an electronic funds transfer ("EFT") network.

11 Claims, 5 Drawing Sheets

(51) Int. Cl.
- *G06Q 20/10* (2012.01)
- *G06Q 30/04* (2012.01)
- *G06Q 20/20* (2012.01)
- *G06Q 20/04* (2012.01)
- *G06F 15/16* (2006.01)
- *H04L 29/08* (2006.01)
- *G06Q 40/00* (2012.01)
- *G06Q 20/40* (2012.01)

(52) U.S. Cl.
CPC ........... *G06Q 20/20* (2013.01); *G06Q 20/382* (2013.01); *G06Q 20/405* (2013.01); *G06Q 30/04* (2013.01); *G06Q 40/00* (2013.01); *H04L 29/08072* (2013.01)

(56) References Cited

U.S. PATENT DOCUMENTS

| | | | | |
|---|---|---|---|---|
| 7,020,633 | B2* | 3/2006 | Strayer | G06Q 20/04 235/379 |
| 7,552,087 | B2 | 6/2009 | Schultz et al. | |
| 7,742,989 | B2 | 6/2010 | Schultz | |
| 2003/0144935 | A1* | 7/2003 | Sobek | G06Q 20/04 705/35 |
| 2004/0064351 | A1* | 4/2004 | Mikurak | G06Q 10/087 705/22 |
| 2005/0108117 | A1 | 5/2005 | Newman | |
| 2006/0010070 | A1* | 1/2006 | Banaugh | G06Q 20/10 705/40 |
| 2007/0045405 | A1* | 3/2007 | Rothschild | G06Q 20/20 235/380 |
| 2007/0164106 | A1* | 7/2007 | McDevitt | G06Q 20/0453 235/383 |
| 2009/0177563 | A1* | 7/2009 | Bernstein | G06Q 20/04 705/30 |
| 2009/0216666 | A1* | 8/2009 | Antao | G06Q 10/10 705/30 |
| 2009/0228365 | A1* | 9/2009 | Tomchek | G06Q 10/00 705/21 |
| 2009/0313132 | A1* | 12/2009 | McKenna | G06Q 20/0453 705/21 |
| 2010/0332265 | A1* | 12/2010 | Smith | G06Q 30/02 705/4 |
| 2011/0006113 | A1* | 1/2011 | Uchikura | G06Q 20/10 235/380 |
| 2011/0145083 | A1* | 6/2011 | Rothschild | G06Q 20/20 705/24 |
| 2012/0005019 | A1* | 1/2012 | LeBlanc | G06Q 30/02 705/14.53 |

OTHER PUBLICATIONS

Retail Touch Points, Retail Touch Points Strategies to Optimize Every Customer Interaction, Aug. 26, 2010 (pp. 1-5).
Digital Receipt Work Team Charter, ARTS-IXRetail Candidate Recommendation, Jan. 11, 2002, Jan. 29, 2010 (pp. 1-21).
How Online Receipt Organizer Works, Aug. 26, 2010 (pp. 1-2).
Association for Retail Technology Standards of the National Retail Federation, ARTS XML Payments Charter v 1.0.0, Apr. 2, 2009 (pp. 1-13).
Third Solutions, Inc., Aug. 26, 2010, (p. 1).

* cited by examiner

FIG. 4

Store Name Grocery Store
Store Number 15

Customer Name Mr. Smith
Date January 1, 2010
Time 12:00 AM

Card Number XXXXXXXXXXXX1234

Item          Price
Apples            $3.00
Bath Towels       $20.00
Cream Cheese      $2.00
Decongestant      $7.00
Envelopes         $3.00

Tax           $2.50
Total         $55.50

Big Savings Discount $4.00

410

Identifier 420

FIG. 5

510 Receive, at a digital receipt server, a digital receipt and an identifier corresponding to the digital receipt.

520 Store, in the digital receipt server, the digital receipt and the identifier corresponding to the digital receipt.

530 Receive, at the digital receipt server, an inquiry and an identifier corresponding to the inquiry.

540 Validate the issuer prior to transmitting the digital receipt to the issuer.

550 Compare the identifier corresponding to the inquiry with the identifier corresponding to the digital receipt.

560 Transmit the digital receipt to the issuer if the identifier corresponding to the inquiry corresponds to the identifier corresponding to the digital receipt

500

SYSTEM AND METHOD FOR COLLECTING AND DISTRIBUTING DIGITAL RECEIPTS

RELATED APPLICATIONS

This patent application is a continuation of U.S. patent application Ser. No. 13/011,132, filed on Jan. 21, 2011, the entirety of which is herein incorporated by reference.

BACKGROUND OF THE INVENTION

Generally, the present application relates to digital receipts. Specifically, the present application discloses techniques relating to coordinating the collection and distribution of digital receipts through the assistance of a digital receipt server.

Electronically based transactions are virtually ubiquitous. Customers can swipe cards in far-ranging locations—from grocery stores to airplanes. Such transactions may travel through an electronic funds transfer ("EFT") network. The ETF network can facilitate or enable customers to transact (e.g., purchase or refund payment for goods and services) with merchants. The customer may have a card, such as a credit card, debit card, or stored value card (e.g, gift card). The customer is the authorizing party in the transaction.

An EFT network may include networks associated with merchant point-of-sale (POS) systems, which could include, for example, an ATM. The POS systems can facilitate the transfer of transaction information through the EFT network. When a customer uses a card to purchase goods or services (or to obtain a refund), the POS systems may transfer transaction information to the financial institution or intermediary associated with the card. As used herein, an acquirer may refer to a merchant and/or associated equipment used for facilitating electronic financial transactions (e.g., POS system). The acquirer can be the source of a transaction that is authorized by the customer. For example, the acquirer can be a merchant that is seeking payment for goods and/or services.

An issuer may refer to a financial institution or intermediary associated with a customer's card. The issuer may include the equipment used for facilitating electronic financial transactions. The issuer can be the party that supplies the cardholder with the ability to create a transaction. The issuer could be a financial institution or an affiliate of a financial institution. The issuer can validate the transaction against the cardholder's associated financial information.

A card-based transaction may begin at an acquirer. The transaction may then travel through one or more networks (e.g., EFT networks) to an issuer for authorization against the customer's account. The transaction data may contain information derived from the card (e.g., the account number), the acquirer (e.g., the merchant number), and the transaction value (e.g., the amount), together with other data which may be generated dynamically or added by intervening systems. The issuer can authorize or decline the transaction and generate a response message for delivery to the acquirer.

Upon completion of a transaction, a receipt may be provided. The receipt may have certain information such as the transaction amount, the date and time, the store location, and the like. Additionally, a receipt may include an itemized list showing the cost of different products or services. As the number of items associated with a transaction grows, so does the length of the receipt.

Messages in an EFT network can have a format defined by the International Organization for Standardization ("ISO") 8583 standard. ISO 8583 defines a message format and a communication flow so that different systems can exchange transactions. For example, ATM and in-store transactions often employ ISO 8583 messaging. MasterCard® and Visa® networks are known to use ISO 8583 messaging, as do many other institutions and networks.

ISO 8583 messaging supports transactions for purchase, withdrawal, deposit, refund, reversal, balance inquiry, payments, and inter-account transfers. The ISO 8583 message format also provides for privately defined content. However, the amount of private content is limited by ISO 8583 message length allocations. Consequently, it may be difficult to adapt an ISO 8583 message to store relatively large amounts of digital receipt information. Furthermore, EFT networks may have relatively low bandwidths, such as dial-up speeds.

BRIEF SUMMARY OF THE INVENTION

According to certain embodiments of the present invention, a method for coordinating the provision of a digital receipt associated with a financial transaction is provided. According to the method, a digital receipt and an identifier corresponding to the digital receipt (e.g., a globally unique identifier) are communicated from an acquirer and received at a digital receipt server. The digital receipt and the corresponding identifier may be communicated through a second network, such as the Internet. The digital receipt and the identifier corresponding to the digital receipt are then stored in the digital receipt server.

The digital receipt server also receives an inquiry and an identifier corresponding to the inquiry, which are communicated from an issuer. The inquiry and the corresponding identifier may be communicated through the second network. Prior to this, the identifier is transmitted from the acquirer to the issuer, for example, through a first network such as an EFT network. The identifier corresponding to the inquiry may be transmitted in an ISO 8583 message.

The digital receipt server may compare the identifier corresponding to the inquiry and the identifier corresponding to the receipt. If these identifiers correspond, then at least a portion of the digital receipt may be transmitted to the issuer, for example, through the second network. In an embodiment, the issuer may be validated before transmitting the digital receipt to the issuer.

According to certain embodiments of the present invention, a system for coordinating the provision of a digital receipt associated with a financial transaction is provided. The system includes a digital receipt server. The digital receipt server, in turn, includes at least one memory and at least one network interface. The at least one memory is configured to store a digital receipt and an identifier corresponding to the digital receipt. The at least one network interface is configured to receive, from an acquirer, the digital receipt and the identifier corresponding to the digital receipt. It is also configured to receive, from an issuer, an inquiry and an identifier corresponding to the inquiry. The at least one network interface may interface with the Internet.

In an embodiment, the digital receipt server is configured to compare the identifier corresponding to the inquiry with the identifier corresponding to the digital receipt. Upon the condition of the identifiers corresponding, the at least one network interface is configured to transmit the digital receipt to the issuer. The digital receipt server may be further configured to validate the issuer and to cause the at least one network interface to transmit at least a portion of the digital receipt to the issuer if the issuer is validated.

In an embodiment, the digital receipt server includes a cloud computing arrangement. The cloud includes a first server portion with a first memory and a second server portion with a second memory. The first memory is configured to store the digital receipt. The second memory is configured to store the identifier corresponding to the digital receipt. In an embodiment, the second server portion includes a file server.

According to certain embodiments of the present invention, at least one non-transitory computer-readable medium including a set of instructions for execution on a processor is provided. The set of instructions includes a reception routine for receiving, at a digital receipt server, a digital receipt and an identifier corresponding to the digital receipt. The digital receipt and the corresponding identifier may be communicated through a second network, such as the Internet. The set of instructions also includes a storage routine for storing, in the digital receipt server, the digital receipt and the identifier corresponding to the digital receipt. Additionally, the set of instructions includes a reception routine for receiving, at the digital receipt server, an inquiry and an identifier corresponding to the inquiry. The inquiry and the corresponding identifier may be communicated through the second network. Prior to this, the identifier is transmitted from the acquirer to the issuer, for example, through a first network such as an EFT network. The identifier corresponding to the inquiry may be transmitted in an ISO 8583 message.

In an embodiment, the set of instructions further includes a comparison routine and a transmission routine. The comparison routine is for comparing the identifier corresponding to the inquiry with the identifier corresponding to the digital receipt. The transmission routine is for transmitting at least a portion of the digital receipt to the issuer if the identifier corresponding to the inquiry corresponds to the identifier corresponding to the digital receipt. In an embodiment, a set of instructions may also include a validation routine for validating the issuer prior to transmitting the digital receipt to the issuer.

According to the foregoing summary, it may be possible to securely store and distribute a digital receipt with a digital receipt server. By communicating with a digital receipt server on a second network, such as the Internet, it may be possible to transmit digital receipt data at higher data rates. It may also be possible to avoid messaging constraints required by the first network, such as an EFT network.

BRIEF DESCRIPTION OF SEVERAL VIEWS OF THE DRAWINGS

FIG. 4 illustrates a digital receipt and an identifier corresponding to the digital receipt, according to certain embodiments of the present invention.

FIG. 5 illustrates a flowchart for a method of collecting and distributing digital receipts, according to certain embodiments of the present invention.

Figure 1:
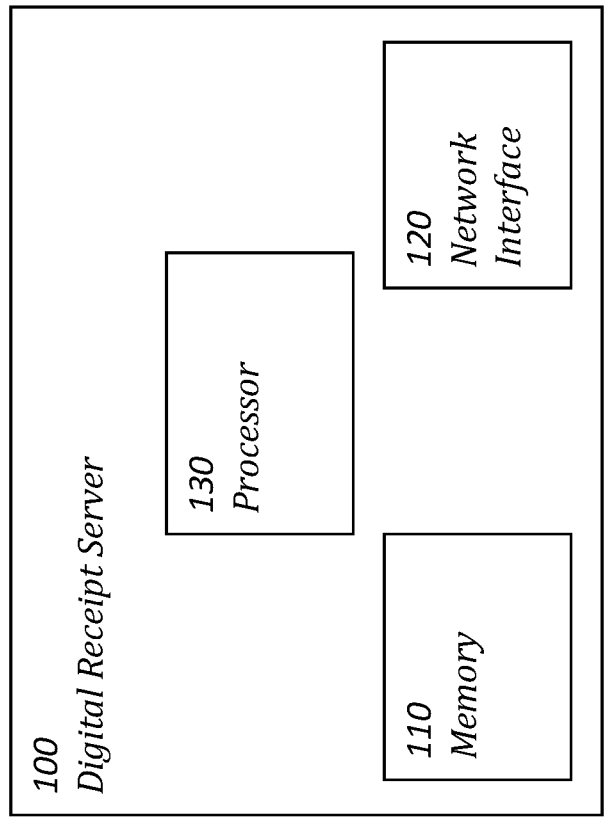
FIG. 1 illustrates a digital receipt server, according to certain embodiments of the present invention.

The foregoing summary, as well as the following detailed description of certain embodiments of the present invention, will be better understood when read in conjunction with the appended drawings. For the purposes of illustration, certain embodiments are shown in the drawings. It should be understood, however, that the claims are not limited to the arrangements and instrumentalities shown in the attached drawings.

DETAILED DESCRIPTION OF THE INVENTION

FIG. 1 illustrates a digital receipt server 100, according to certain embodiments of the present invention. The digital receipt server 100 may be included in a system for coordinating the collection and distribution of digital receipts.

The digital receipt server 100 may include a memory 110, a network interface 120, and a processor 130. The memory 110 may include one or more memories. The network interface 120 may include one or more interfaces. The processor 130 may include one or more processors. As will be further illustrated in FIG. 2, a digital receipt server (such as digital receipt server 100) may be implemented as a distributed or cloud system.

The memory 110 may be configured to store data that is received through the network interface 120. The memory 110 may store a set of instructions for execution by the processor 130. The memory 110 may contain various types of storage (e.g., RAM, ROM, EEPROM, etc.) used for various purposes. For example, the memory 110 may be configured to store a digital receipt and an identifier corresponding to the digital receipt as will be further discussed. The network interface 120 may be configured to interface with one or more networks. For example, the network interface 120 may be configured to interface with the Internet.

Figure 2:
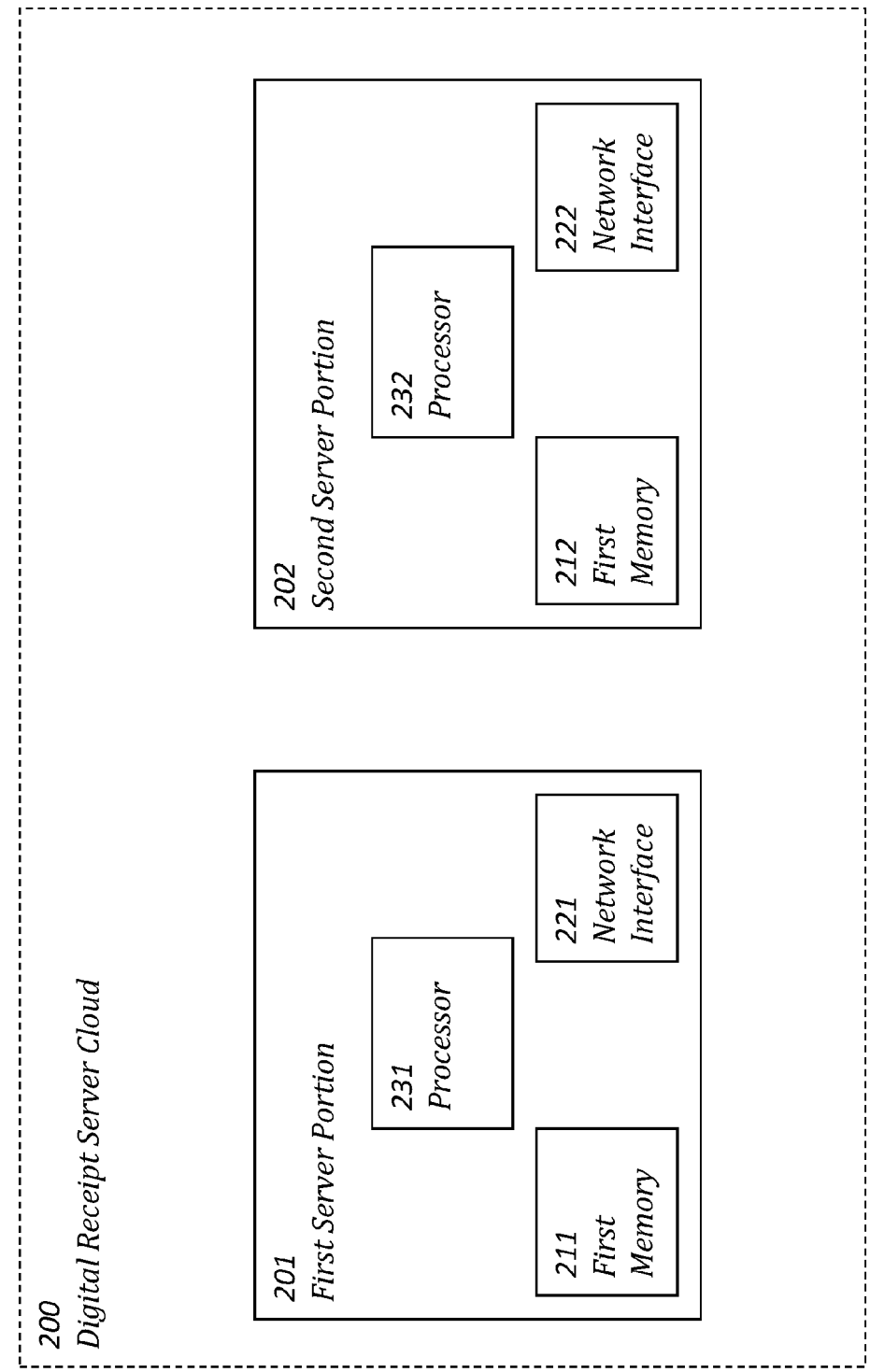
FIG. 2 illustrates a digital receipt server cloud, according to certain embodiments of the present invention.

FIG. 2 illustrates a digital receipt server cloud 200, according to certain embodiments of the present invention. The digital receipt server cloud 200 may be similar in many respects to the digital receipt server 100. The concept of a cloud as discussed herein indicates that the operational characteristics of a digital receipt server can be implemented through coordinated activities of two or more network-linked devices.

The digital receipt server cloud 200 may include a first server portion 201. The first server portion 201 may include a first memory 211, a first network interface 221, and a first processor 231. The digital receipt server cloud 200 may also include a second server portion 202. The second server portion 202 may include a second memory 212, a second network interface 222, and a second processor 232. The first server portion 201 and the second server portion 202 may be configured to communicate with each other. The cloud may include any number of server portions. The cloud may act as a collection and distribution point for digital receipt activities.

Figure 3:
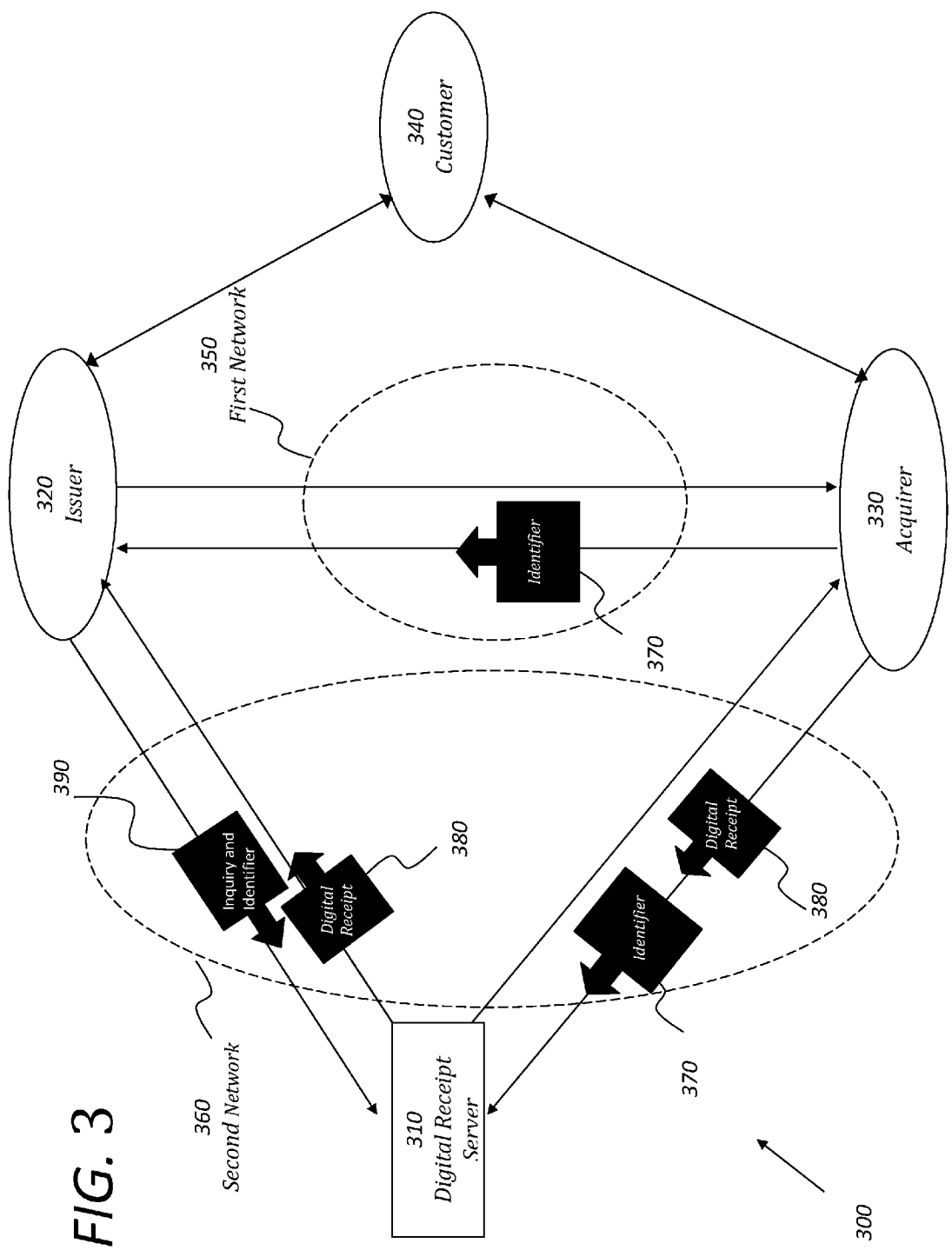
FIG. 3 illustrates a schematic representation diagram of networks that facilitate electronic collection and distribution of digital receipts, according to certain embodiments of the present invention.

FIG. 3 illustrates a schematic representation diagram 300 of networks that facilitate electronic collection and distribution of digital receipts, according to certain embodiments of the present invention. The parties to a financial transaction that generates a digital receipt may include an issuer 320, an acquirer 330, and a customer 340.

The customer 340 may include a person and customer information or associated devices/apparatuses. For example, the customer 340 may include the customer's card or card information. The customer 340 may also include software that can access and interact with computer systems of the issuer 320. As illustrated, the customer 340 can interact with the acquirer 330 and the issuer 320. For example, a customer 340 and the acquirer 340 may transact a financial transaction. To this end, the customer 340 may interact with the acquirer 330 by swiping a credit card issued by the issuer 320 at POS equipment of the acquirer 330. The acquirer 330 may generate a digital receipt 380 and a corresponding identifier 370 upon completion of the financial transaction.

To facilitate the financial transaction, the acquirer 330 and the issuer 320 may communicate through a first network 350. The second network 350 may include, for example, one or more EFT networks. The acquirer 330 and issuer 320 may communicate through the second network 350 with messaging, such as ISO 8583 compliant messaging. The acquirer 330 may employ messaging through the second network 350 to transmit the corresponding identifier 370 to the issuer 320. The bandwidth of the second network may be substantially greater than the bandwidth of the first network. For example, the bandwidth of the first network may be on the order of Kbits/Second, whereas the bandwidth of the second network may be on the order of Mbits/Second or Gbits/Second.

The diagram 300 illustrates a digital receipt server 310. The digital receipt server 310 may be similar to the digital receipt server 100 or the digital receipt server cloud 200. The acquirer 330 may communicate with the digital receipt server 310 through a network such as the first network 360. The first network 360 may include one or more networks, such as the Internet. The acquirer 330 may transmit the digital receipt 380 and the corresponding identifier 370 to the digital receipt server 310.

The digital receipt server 310 may also communicate with the issuer 320 through a network such as the first network 360. The issuer 320 may transmit an inquiry and identifier 390 to the digital receipt server 310. The digital receipt server 310 may responsively transmit the digital receipt 380 to the issuer 320.

FIG. 4 illustrates a digital receipt 410 and a corresponding identifier 420, according to certain embodiments of the present invention. The digital receipt may be similar to digital receipt 380. The corresponding identifier 420 may be similar to identifier 370.

The digital receipt 410 may include various types of information, such as a store (e.g., acquirer) name and number, customer name, an identification of the customer's card, a date and time of the transaction, a list of purchased items, and a corresponding list of sales prices, taxes, total, and discounts. Of course, this list is non-limiting and various other types of information may be included in a digital receipt—e.g., store address and phone number, account number, approval number, card type, total number of items, and/or the like. The corresponding identifier 420 may be included as part of the digital receipt 410 (e.g., unique transaction ID), or may be separate while still being associated with the digital receipt 410.

FIG. 5 illustrates a flowchart 500 for a method of collecting and distributing digital receipts, according to certain embodiments of the present invention. The steps illustrated in the flowchart 500 may be performable at least in part by a digital receipt server, such as the digital receipt servers 100, 310, or the digital receipt server cloud 200. Furthermore, the steps illustrated in the flowchart 500 may be performable in a different order, or some steps may be omitted according to design and/or clinical preferences. For example, step 540 could be omitted or performed after step 550. The steps illustrated in the flowchart 500, or a portion thereof, may be performable by one or more processors (e.g., the processors 130, 231, or 232). The steps illustrated in the flowchart 500, or a portion thereof, may be performable by software, hardware, and/or firmware. The steps illustrated in the flowchart 500, or a portion thereof, may also be expressible through a set of instructions stored on one or more computer-readable storage media, such as RAM, ROM, EPROM, EEPROM, optical disk, magnetic disk, magnetic tape, and/or the like.

At step 510, a digital receipt and an identifier corresponding to the digital receipt is received at a digital receipt server. The digital receipt and the corresponding identifier may be received, for example, through a network interface, such as network interfaces 120, 221, or 222. The digital receipt and the corresponding identifier may be communicated from the acquirer. For example, the acquirer may communicate with the digital receipt server through a second network, such as the Internet.

The digital receipt (such as digital receipt 410) may include various types of information, such as the acquirer's name, the acquirer's address, the acquirer's identification number, the customer's name, an identification of the customer's card, a date and time of the transaction, a list of purchased or returned items, a corresponding list of sales prices, subtotals, total price paid, taxes, and/or the like.

The identifier corresponding to the digital receipt may uniquely identify the digital receipt. The identifier corresponding to the digital receipt may be generated by the acquirer. The identifier corresponding to the digital receipt may be transmitted separately or together with the digital receipt. The identifier corresponding to the digital receipt may be encoded or contained within the digital receipt data itself. For example, an identifier corresponding to the digital receipt may reflect a combination of digital receipt data, such as the acquirer's name and identification number, the date and time, and the customer's name. The identifier corresponding to the digital receipt may undergo a translation or other encoding while still uniquely identifying the digital receipt. The acquirer may obtain a block of identifiers for assignment from the issuer or from the digital receipt server.

At step 520, the digital receipt and the identifier corresponding to the digital receipt are stored in the digital receipt server. The digital receipt and the corresponding identifier may be stored, for example, in memory 110, 211, or 212. The digital receipt and the corresponding identifier may be stored together or may be appropriately linked. The digital receipt and the corresponding identifier may be stored in physically separated memories. For example, there may be two memories in a digital receipt server cloud, such as the digital receipt server cloud 200. The first memory may be located in a first server portion and the second memory may be located in a second server portion. The second server portion may be, for example, a file server. The digital receipt may be stored in the first memory and the corresponding identifier may be stored in the second memory. Even if stored in different memories, the digital receipt and the corresponding identifier may still be logically linked.

At step 530, an inquiry and an identifier corresponding to the inquiry are received at the digital receipt server. The inquiry and the corresponding identifier may be received, for example, through a network interface, such as network interfaces 120, 221, or 222. The inquiry and the corresponding identifier may be communicated from the issuer. For example the issuer may communicate with the digital receipt server through a second network, such as the Internet. The identifier corresponding to the inquiry may be transmitted separately or together with the inquiry. Prior to transmission from the issuer, the identifier corresponding to the inquiry may be transmitted from the acquirer to the issuer. For example, the identifier corresponding to the inquiry may be transmitted from the acquirer to the issuer through a first network, such as an EFT network. The identifier corresponding to the inquiry may be transmitted according to ISO 8583 messaging.

At step 540, the issuer is validated prior to transmitting the digital receipt to the issuer. The validation may be performed by one or more processors, such as processors 130, 231, and 232. Validation may include, for example, techniques related to a unique issuer ID, key exchanges, passphrases, an ABA number, or other unique identifier(s).

At step 550, the identifier corresponding to the inquiry and the identifier corresponding to the digital receipt are compared. The comparison may be performed by one or more processors, such as processors 130, 231, and 232. At step 560, at least a portion of the digital receipt is transmitted to the issuer if the identifier corresponding to the inquiry corresponds to the identifier corresponding to the digital receipt. The digital receipt may be transmitted, for example, through the second network. Depending on design preferences, it may not be necessary to transmit the entire digital receipt to the issuer. For example, it may be possible to omit some of the detail that describes an itemized list of purchased goods in the transmitted digital receipt.

To illustrate an example, the flowchart 500 for the method may be implemented in the following manner. The Grocery Store has a POS system that includes a terminal for swiping cards. The POS system communicates with a digital receipt server through the Internet and to the Bank through an EFT network. The digital receipt server can also communicate with the Bank through the Internet. The EFT operates at dial-up speeds, while the connections to the Internet support data rates in the Gbit/Second range.

A customer visits the Grocery Store and wishes to purchase apples, bath towels, cream cheese, a decongestant, and envelopes. The customer swipes a credit card issued by the Bank to pay for the groceries at the POS terminal. The customer also uses his Big Savings card to get a discounted price on some of the groceries. In order to authorize and complete the transaction, the POS system communicates with the Bank over the EFT network using ISO 8583 messaging. Fortunately, the customer has sufficient credit on his Bank credit card. Therefore the Bank approves the purchase and the Grocery Store completes the transaction with the customer.

After the transaction is complete, the POS system automatically generates a digital receipt 410 that includes the Grocery Store's name and store number, the date, the time, the customer's name, the list of grocery items and the corresponding prices, the price discount from the Big Savings card, the subtotal of the item prices, the tax, and the total price paid for the transaction. The POS system also automatically assigns a unique identifier 420 to the digital receipt.

The POS system then transmits the digital receipt 410 along with the corresponding identifier 420 through the Internet. At steps 510 and 520, the digital receipt server receives and stores the digital receipt 410 and the corresponding identifier 420 in a memory.

The POS system also transmits the corresponding identifier 420 to the Bank through the EFT network. After the Bank receives the identifier 420 corresponding to the digital receipt, the Bank attempts to retrieve the digital receipt 410 from the digital receipt server. The Bank takes the identifier 420 corresponding to the digital receipt and associates it with an inquiry. The identifier 420 corresponding to the digital receipt, in this instance, becomes the identifier corresponding to the inquiry. The Bank communicates with the digital receipt server through the Internet. The Bank sends the inquiry and the identifier corresponding to the inquiry to the digital receipt server. The inquiry requests the digital receipt server to return a portion of the digital receipt. The inquiry requests all of the types of information in the digital receipt except for the information regarding the price discount from the Big Savings card.

At step 530, the digital receipt server receives the inquiry and the identifier corresponding to the inquiry from the Bank. The digital receipt server authenticates the Bank, and at step 540 validates the Bank. Once the Bank has been validated, the digital receipt server compares the identifier corresponding to the inquiry with the identifier corresponding to the digital receipt at step 550. The identifiers match. At step 560, the digital receipt server then transmits the requested portion of the digital receipt 410 to the Bank.

Subsequently, it may be possible for the customer to access the Bank's website to view and download the information retrieved from the digital receipt server. The customer may be able, for example, to load the information into his personal finance software which accounts for and analyzes the prices paid for each of the groceries. The software may recognize that, within the Grocery Store transaction, there are two food items (apples and cream cheese), one household item (bath towels), one medication item (decongestant), and one office supply item (envelopes).

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A method for coordinating provision of a digital receipt associated with a financial transaction involving a customer, the method comprising:
   generating, by an acquirer, a digital receipt corresponding to the financial transaction;
   generating, by the acquirer, an identifier corresponding to the digital receipt, wherein the identifier uniquely identifies the digital receipt;
   transmitting, by the acquirer, the digital receipt and the identifier to a digital receipt server via the internet;
   transmitting, by the acquirer, the identifier to an issuer via an electronic funds transfer ("EFT") network using messaging compliant with ISO 8583;
   transmitting, by the issuer, an inquiry and the identifier to the digital receipt server via the internet; and
   in response to the inquiry, receiving, at the issuer, information contained in the digital receipt from the digital receipt server via the internet.

2. The method of claim 1, wherein the information contained in the digital receipt digital receipt includes an itemized list of costs for a plurality of different items.

3. The method of claim 1, further comprising transmitting, from the issuer, the information contained in the digital receipt to a device associated with the customer.

4. The method of claim 1, wherein a bandwidth of the internet is greater than a bandwidth of the EFT network.

5. A method for coordinating provision of a digital receipt associated with a financial transaction, the method comprising:

generating, by an acquirer, a digital receipt corresponding to a financial transaction with a customer;

generating, by the acquirer, an identifier corresponding to the digital receipt, wherein the identifier uniquely identifies the digital receipt;

transmitting, by the acquirer, the digital receipt and the identifier to a digital receipt server via the internet;

transmitting, by the acquirer, the identifier to an issuer via an electronic funds transfer ("EFT") network using messaging compliant with ISO 8583, wherein the digital receipt is not transmitted by the acquirer to the issuer;

transmitting, by the issuer, an inquiry and the identifier to the digital receipt server via the internet; and in response to the inquiry, receiving, at the issuer, information contained in the digital receipt from the digital receipt server via the internet.

6. The method of claim 5, wherein the information contained in the digital receipt includes an itemized list of costs for a plurality of different items.

7. The method of claim 5, further comprising transmitting, from the issuer, the information contained in the digital receipt to a device associated with the customer.

8. The method of claim 5, wherein a bandwidth of the internet is greater than a bandwidth of the EFT network.

9. A system for coordinating provision of a digital receipt associated with a financial transaction involving a customer, the system comprising:

an acquirer configured to:
generate a digital receipt corresponding to the financial transaction;

generate an identifier corresponding to the digital receipt, wherein the identifier uniquely identifies the digital receipt;

transmit the digital receipt and the identifier to a digital receipt server via the internet; and transmit the identifier to an issuer using messaging compliant with ISO 8583 via an electronic funds transfer ("EFT") network; and the issuer is configured to:
receive the identifier from the acquirer via the EFT network;

transmit an inquiry and the identifier to the digital receipt server via the internet; and in response to transmitting the inquiry, receive information contained in the digital receipt from the digital receipt server via the internet.

10. The system of claim 9, wherein the information contained in the digital receipt includes an itemized list of costs for a plurality of different items.

11. The system of claim 9, wherein a bandwidth of the internet is greater than a bandwidth of the EFT network.

* * * * *